Patented Sept. 26, 1950

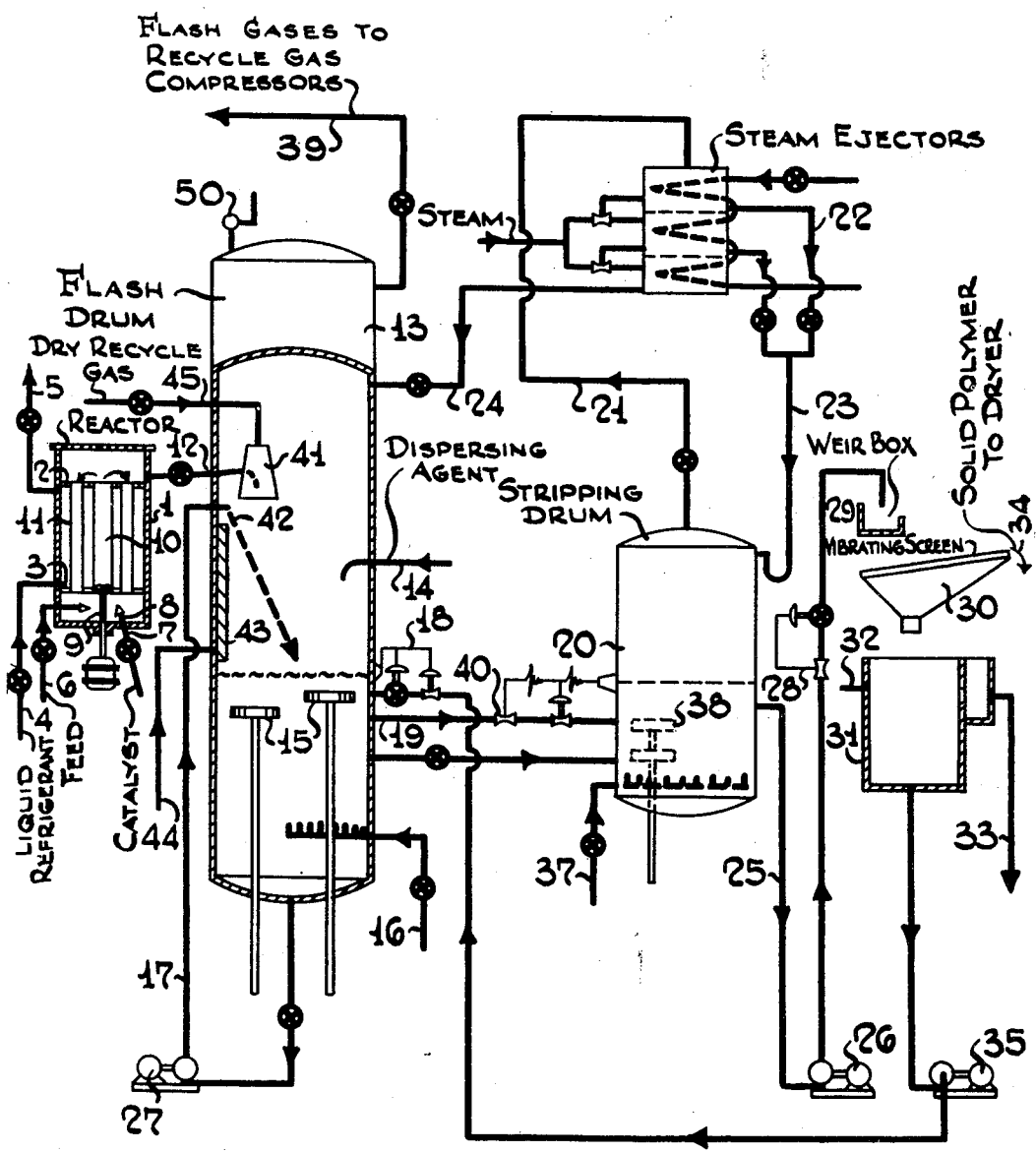

2,523,289

UNITED STATES PATENT OFFICE 2,523,289

MODIFYING AGENTS FOR USE IN LOW-TEMPERATURE POLYMERIZATION REACTIONS

Per K. Frolich, Westfield, N. J., assignor, by mesne assignments, to Jasco, Incorporated, a corporation of Delaware Application August 14, 1945, Serial No. 610,838

17 Claims. (Cl. 260—85.3)

This invention relates to the preparation of hydrocarbon polymers, and relates more particularly to a method for improving the handling and processing characteristics of rubbery polymer materials, and is a continuation-in-part of Serial No. 428,834, filed January 30, 1942, now U. S. Patent 2,456,265.

It is known that high molecular weight, synthetic polymers of an iso-olefin such as isobutylene, or interpolymers of an iso-olefin such as isobutylene with a diolefin such as butadiene or isoprene or piperylene or dimethyl butadiene can be produced by the use of a low temperature technique, in which the olefin or mixed olefins are cooled to temperatures ranging from $-20°$ C. to $-100°$ C. or $-150°$ C., or even lower, by the admixture with the olefin or mixed olefins of a diluent-refrigerant such as liquid ethylene or other low boiling liquid hydrocarbon substances, or by the use of solid carbon dioxide or by suitable external refrigeration of the reactor, in which cases the reactants are preferably admixed with a diluent such as methyl chloride; and applying to the cool mixture a dissolved active halide catalyst, or Friedel-Crafts type catalyst, such as $AlCl_3$ or $AlBr_3$ or titanium tetrachloride or the like, dissolved in a low freezing, inert solvent such as ethyl or methyl chloride or carbon bisulfide. The catalyst may be introduced, for example, by spraying it onto the surface of the rapidly stirred olefinic mixture, or by mixing it directly into the body of the agitated liquid. The reaction begins promptly and may reach a desired stage, approaching complete polymerization within a relatively few minutes. The material obtained after interpolymerizing the mixed olefins has a low unsaturation, usually measured by an iodine number ranging from 1 to 40 or 50, and usually has a molecular weight above 15,000, preferably within the range of about 30,000 to about 150,000 or even higher. The interpolymeric material, in spite of its relatively low unsaturation, shows the property of reactivity with sulfur to produce a cured material having an elastic limit, a tensile strength at break ranging from 1,000 to 5,000 pounds per square inch and an elongation at break ranging from 500% to 1200%.

Because of the difficulty in obtaining the solid polymer in the form of small particle aggregates with a physical structure adapted for efficient and convenient subsequent processing through such steps as the flashing off of unreacted olefinic material, diluent and refrigerant if present and the washing out of spent catalyst or residual catalyst it has been proposed previously to form the polymer as a slurry in the diluent and introduce the slurry into a flash tank of water to flash off the diluent and any remaining reactants. However, when operating in this manner, it has been found difficult to obtain stable water slurries which can be easily removed from the flash tank and pumped through pipelines. Also it is difficult to prevent cohesion between the particles of polymer particularly in the water used for flashing off the diluent and the unreacted olefins and to prevent adhesion of the particles of polymer to the reactor, to the walls of the flash tank, to transfer pipe lines, to the supporting screens in the drier, and other metal objects with which it comes in contact. These characteristics of the newly polymerized material interfere seriously with the complete removal of spent and surplus catalyst, since the sticky character of the polymer causes it to adhere to treating apparatus, and to cohere in relatively large lumps, containing occluded catalyst which cannot be washed out. Large lumps are also undesirable in the wash water since the resulting slurry plugs pipe lines and becomes so coarse that it cannot be removed from the slurry system.

According to the method described in Serial No. 428,834 of which the present application is a continuation-in-part, these undesirable polymer characteristics are eliminated and fine particle suspensions or slurries are obtained by adding into the reaction mixture, either prior to the polymerization reaction, or prior to the flashing operation, a small quantity of a dispersing agent, such as an inorganic salt of a higher fatty acid, preferably prepared from fatty acids of a saturated nature.

It has now been found that finer and more stable slurries are formed by adding the dispersing agent to the wash water into which the polymer is introduced, rather than by adding the dispersing agent to the reaction mixture or to the formed polymer.

The present invention provides a new and useful combination of steps for the processing of low temperature polymerizates to produce the solid olefinic polymers or interpolymers in the form of fine grained slurries; to the making of polymer or copolymer slurries in water which are readily handled and blended and from which the polymer can be readily separated and dried.

Broadly, the present invention consists of the steps of preparing a reactive mixture of the desired olefinic material at the desired low temperature as taught in the copending application of Thomas and Sparks, Serial No. 182,252, now U. S.

2,356,127, and Sparks, Serial No. 300,336, now U. S. 2,356,128; the reacting material being preferably isobutylene either with or without a diolefin such as butadiene, or isoprene, or 2,3-dimethyl butadiene-1,3; or with piperylene, or a non-conjugated diolefin such as 2-methyl hexadiene-1,5; 2,6-dimethyl-hexadiene-1,5; or tri-olefins such as hexatriene, myrcene, 1,6-dimethyl heptatriene-1, 3,5 and 2,4,6-trimethyl, hexatriene-1,3,5 or the like; and cooling the mixture by internal or external refrigeration, e. g., by liquid ethylene, to a temperature ranging from −10° C. to −100° C. or as low as −160° C. To this mixture there is then added a Friedel-Crafts type active halide catalyst, which may be boron fluoride or aluminum chloride in solution in an inert low freezing solvent or may be other similar active halide catalyst materials. This polymerization reaction is conducted under conditions to give a finely pulverulent form of polymer or interpolymer particles, which is highly desirable in order to permit the maximum speed of processing the solid polymer in subsequent operations.

When the polymerization reaction has reached the desired stage of completion, it is passed to a wash tank containing warm water which volatilizes out most of the volatile components and, at the same time, deactivates and washes out much of the deactivated catalyst. According to the present invention the polymer is maintained in a discrete form by the addition to the warm water, prior to or simultaneously with the addition of the polymer thereto, of a dispersing agent. It is preferable to add the dispersing agent to the water as a dispersion in alcohol or in a mixture of alcohol and water, or in water containing a desirable wetting agent.

Referring to the drawing, the polymerization equipment consists of a tube bundle type of reactor 1 such as described in the patent application of Bannon (U. S. Serial No. 448,575, filed June 26, 1942, now abandoned). No internal refrigerant is used, all the heat of reaction being transferred through the reactor walls to an external refrigerant. The liquid refrigerant, suitably ethylene is introduced into the space between tube sheets 2 and 3 through line 4, while vaporized refrigerant leaves the said space through line 5. Precooled reactant mixture of iso-olefin and di-olefin enters the reactor through line 6. The polymerization mixture desirably consists of from about 70 to 99.5 wt. percent of an iso-olefin having from 4 to 8 carbon atoms per molecule, isobutylene being the preferred material and from about 30 to 0.5 wt. percent of a diolefin. The diolefin may be butadiene or may be substantially any of the substituted butadienes up to those having from 10 to 12 carbon atoms per molecule. Preferred diolefins are isoprene, piperylene and dimethyl butadiene. Alternatively, the non-conjugated diolefins, such as dimethylallene, or the triolefins, such as myrcene, having up to 10 or 12 carbon atoms per molecule, may also be used. The polymerization mixture contains in addition from 100 parts to 700 or more parts of a diluent such as methyl chloride, ethyl chloride, isobutane, carbon disulfide, dichloro-difluoromethane, n-butane, etc. However, it is possible to operate without the use of a diluent. The liquid ethylene as external refrigerant cools the mixture to a temperature between −97° C. and −103° C. Catalyst solution is added through line 7 provided with a suitable dispersing nozzle.

The catalyst conveniently consists of a solution of a Friedel-Crafts type catalyst such as aluminum chloride, in solution in a non-complex-forming, low-freezing solvent such as ethyl or methyl chloride or carbon disulfide or other mono- or poly-halide containing up to 3 or 4 carbon atoms per molecule or other non-complex-forming solvent which is liquid at temperatures below about −30° C. The list of useable Friedel-Crafts catalyst is well shown by N. O. Calloway in his article on "The Friedel-Crafts Synthesis" in the issue of "Chemical Reviews" published for the American Chemical Society at Baltimore in 1935, being volume XVII, Number 3, the article beginning on page 327, the list being particularly well shown on page 375.

The reactant mixture is thoroughly agitated by impeller type agitator 9, so that a circulation of the reacting mixture is produced up through central tube 10 and down through a plurality of peripheral smaller tubes 11, set between tube sheets 2 and 3. The reaction proceeds promptly to form a slurry of solid polymer particles in the diluent and unreacted olefinic components. In those cases in which no diluent is used the polymer forms as a highly dispersed gel in the cold reactant liquid. When a hydrocarbon, such as normal butane, is used as a diluent, the polymer forms a solution in the hydrocarbon. The rate of catalyst delivery with respect to the rate of delivery of fresh reactants is preferably adjusted to such a relationship that the proportion of solid polymer in the reacted mixture is less than about 30%. The polymerization reaction being exothermic, heat is liberated as the solid polymer forms and is removed by the liquid ethylene in the space between sheets 2 and 3. The reactor is maintained essentially full of liquid, a mixture of relatively finely divided polymer and excess unreacted hydrocarbons plus diluent overflowing from the reactor through line 12 in amount corresponding to the material fed to the reactor through lines 6 and 7 at a velocity of between 1 and 3 feet per second, discharging into tank 13 in a downward direction. Line 12 may be tilted upward as shown to provide an effective liquid seal on the reactor. To prevent water vapor from the flash tank getting back into the line 12 which may not run full, conical hood 41 is provided over this discharge end of piping 12. This hood is of the type described in U. S. patent application Serial No. 502,258, filed September 14, 1943, by Messrs E. V. Murphree, W. W. Waterman and A. D. Green, now U. S. Patent 2,395,901, and is for the purpose of preventing access of water vapor to the immediate neighborhood of a cold reactor discharge pipe, thus preventing build-up of ice or icy hydrates in this region. The hood is supplied with a dry flushing gas through line 45. The flushing gas may be an inert gas such as $CO_2$, nitrogen, methane, or more conveniently, a small stream of dry recycle gas from the recovery system. A velocity of flushing gas at the bottom of the conical hood of 10 to 15′ per minute has been found sufficient to prevent icing. Flash tank 13 is a relatively large vessel designed to withstand mild pressure surges, of the order of 1–10 lbs./sq. in. having a relatively large vapor space, providing preferably several minutes nominal hold-up of the vapors in the flash tank. The tank is supplied with water or other suitable liquid maintained at a suitable level by means of level control 18 actuating flow control valve 40 which controls the rate of withdrawal of slurry from the flash tank. The water slurry is maintained at a suitably elevated temperature level, for example at 100° to 180° F., by means of steam injected through pipe 16 and is kept well agitated by means of turbine type agitators 15. In order to prevent the polymer from agglomerating and to produce a finely divided uniform slurry which can be easily pumped, a dispersing agent is introduced into the flash tank water through line 14 or it may be added to line 17 or at any other convenient place. The dispersing agent is added either continuously or intermittently as desired.

When the reactor is filled to the overflow level, the addition of further olefinic material through the pipeline 6 and catalyst solution through line 7 causes an overflow of the polymer slurry containing from about 70% of its weight to about 95% of its weight of liquid, unreacted, olefinic material plus diluent into the warm liquid, such as water, in the tank 13. This liquid in the flash tank contains a small amount of a material which prevents the polymer from agglomerating when introduced into the water and keeps it dispersed throughout the slurry. Suitable slurry dispersing agents comprise finely divided aluminum monostearate, aluminum distearate, aluminum tristearate, zinc stearate, magnesium stearate, calcium stearate and similar salts of palmitic, etc. acids of high molecular weight and surface active agents in general. If the liquid used is water or other material in which the salt is insoluble, the salt is preferably introduced into the water with a wetting agent, such as methyl chloride, ethyl ether, a ketone, or preferably a low molecular weight alcohol, such as isopropyl alcohol. Water soluble soaps, such as sodium sulfonates, water-soluble petroleum sulfonic acids or any of the commercial surface active agents disclosed in Industrial and Engineering Chemistry, January 1939, pp. 66–69; January 1941, pp. 16–22 and January 1943, pp. 126–130 may also be used as the wetting agent. For example, the salt may be made into a thick slurry with alcohol, alcohol and water, or with water containing one of the above wetting agents and this slurry is continuously pumped into the large amount of water in tank 13. About 1 to 4% of the metallic stearate based on the polymer is used.

The polymer and cold liquid falling from the hood is caught by a rapidly moving sheet of water from line 17 and pump 27 discharging through jet 42 and directed at the center of the surface of the water in the flash tank. For this purpose a 1½" x 7" rectangular nozzle may be advantageously used for a water flow of about 400 gallons per minute. To protect the tank from sharp thermal shock in case of failure of the water jet a skirt or baffle 43 is provided, a small amount of steam being admitted behind it through line 44. In this way provision is made for protecting the wall of the flash tank from contact with the cold slurry which may accidently splash against the wall of the tank as it issues from line 12.

The warm liquid, e. g. water, volatilizes out most of the volatile components and at the same time deactivates and washes out much of the deactivated catalyst. Steam is supplied to the flash tank water at 16, to replace the heat lost due to vaporization of the unreacted materials. The polymer tends to float upon the surface of the water but is kept suspended in the water by action of the agitators 15. It contains less than 1%, usually less than 0.1% of volatile hydrocarbon materials.

The vapors leave the flashing zone through line 39 and are fed to compression, drying, liquefaction, and distillation equipment for recovery and return to the reaction zone. The slurry of polymer in water leaves the flashing zone through line 19 and control valve 40 and passes into stripping vessel 20 wherein a suitable sub-atmospheric pressure is maintained. The purpose of this stripping zone is to complete as far as possible removal of volatile materials from the polymer and from the water. In this way loss of valuable reactant or diluents is minimized, as are fire and other hazards. In addition to the removal of these volatile materials from the polymer, the stripping operation when combined with properly controlled hot air drying in a thru-circulation, tunnel type dryer, makes it possible to achieve essentially complete degassing without necessitating resort to heavy mechanical treatment.

A constant level is held in the stripping zone as well as in the flashing zone. The stripper level actuates control of the rate of flow of slurry from the flashing zone to the stripping zone by control valve 40 and the liquid level in the flashing zone controls the return of water to said flashing zone from the vibrating screen pump by means of control valve 18. In this way a minor upset in flow in any part of the system is less likely to cause improper levels to be held in either of the two zones. It is important to maintain the proper level, since too low a level results in an inordinately heavy and difficultly handled slurry while too high a level increases the volume of liquid being agitated and hence decreases agitation per unit voume to the extent that considerable settling of the polymer to the surface tends to occur. The stripping vessel is, like the flashing vessel, provided with an agitator 38, a steam injector 37, and a vapor outlet 21. The pressure in the stripping zone is maintained at about 2 to 5 lbs./sq. in. abs. by means of a 2-stage steam injector 22, which embodies condensers before and after each ejector stage. The condensate from the low pressure stages is returned to the stripper through leg 23 while the recovered vapors are sent to the flashing zone through line 24. The slurry leaves the stripper through line 25 with the aid of pump 26 at a rate controlled by flow controller 28 and passes into weir box 29 from which it is distributed over vibrating screen 30. Excess water drains through the vibrating screen into tank 31, the moist polymer discharged from the end of vibrating screen at 34 containing a substantial percentage of water. The moist polymer is supplied to an endless screen passing through a tunnel dryer of the through-circulation type in which hot air is recirculated over steam coils and down through a bed of material on the screen. Fresh air enters at the discharge end of the tunnel and moist air is exhausted to the atmosphere at various points along the dryer. Drying temperatures of up to about 340° F. are utilized and these conditions of good contact of the rapidly moving air stream with finely divided polymer suffice to drive off residual volatile materials which would ordinarily give rise to blister formation during vulcanization if they were not removed. Water draining through vibrating screen 30 into tank 31 is returned to the flash tank 13 by means of pump 35 and flow controller 18 in order to save water and any valuable materials contained therein.

Tank 31 is provided with fresh water makeup 32 and a water overflow 33 to provide for purging any undesirable accumulations. It will be noted that flow controllers shown in slurry lines utilizes a Venturi meter instead of the usual orifice type of meter as the measuring device in order to avoid plugging by the solid polymer particles. The control valves are also of a special streamlined design which are not readily plugged by solid material. In order to take care of any large surges in pressure as may occur if a large slug of polymer or of reaction mixture should strike the water in the tank, a suitable safety valve 50 may be provided on the flash chamber. Slight modifications of this equipment may be used but in all of these modifications dispersing agents such as zinc stearate, et cetera, are added to the water in the flash tank.

The following examples illustrate the operation of this invention:

Example 1

1450 cc. of isobutylene and 20 cc. of isoprene were diluted with 2800 cc. of methyl chloride and externally cooled with liquid ethylene, while a catalyst consisting of AlCl₃ dissolved in methyl chloride was slowly added. The reactants were vigorously agitated while the catalyst was added. The reaction slurry resulting from the polymerization was slowly poured into vigorously agitated water heated initially to 80°–85° C. in a flash tank. The polymer all collected into one lump in the agitated water.

Example 2

Example 1 was repeated with the following modification: 6 g. of zinc stearate were added in small portions to the reactants during the polymerization. The reaction slurry, when poured into the agitated quench water, again coalesced. The result was a lump in the quench water.

Example 3

In another experiment carried out the same as Example 2, a slurry was obtained in the quench water, but it was "meshy." The individual particles tended to stick together.

Example 4

Example 1 was repeated with the following modification: While the reaction slurry resulting from the polymerization was being poured into the agitated quench water, 6 g. of zinc stearate were simultaneously added in small portions to the water. An excellent finely divided slurry of polymer formed in the quench water.

Example 5

This experiment was a check on Example 4. An excellent finely divided slurry of polymer in the quench water was again obtained.

The above series of experiments shows that the addition of the dispersing agent to the quench water produces the best dispersion of the polymer in the water. A similar series of experiments was performed as follows:

Example 6

1450 cc. of isobutylene and 40 cc. of isoprene were diluted with methyl chloride and polymerized and quenched in water as in Example 1. A fairly good slurry was formed in the water, but it was unstable and quickly set-up when the agitation was stopped.

Example 7

Example 6 was repeated with the following modification: 6 g. of zinc stearate were simultaneously added along with the reaction slurry to the agitated quench water. An excellent slurry of the polymer in the quench water was formed. The finely dispersed polymer including some water was removed from the main body of the water. After three days of standing in the laboratory, it showed but little tendency to coalesce.

Example 8

This experiment was similar to Example 7, except that magnesium stearate was used in place of zinc stearate. The aqueous slurry of the polymer was even superior to that obtained in Example 7. The polymer including a little water was removed from the main body of the water, and after three days of standing in the laboratory, it showed no tendency to coalesce.

Example 9

A plant run was made in which equipment equivalent to that shown in the attached drawing was used. The feed consisted of about 15 parts by weight of isobutylene and 100 parts of methyl chloride. The catalyst consisted of a methyl chloride solution of AlCl₃ containing about 0.15 g. of AlCl₃ per 100 cc. No dispersion agent was used in the flash tank 13. The run had to be terminated as a result of the polymer agglomerating in the water in tank 13. This agglomerated polymer had to be dug out of the flash tank by hand, which was a very laborious and time consuming job.

In a duplicate run, two per cent of zinc stearate based on the polymer was added continuously to the water in the flash tank. In this run, a slurry of the polymer in water was formed and this slurry was satisfactorily delivered to the vibrating screen 30.

These examples and the practicing of this invention show that the broad class of water insoluble alkaline earth and metal salts of the higher fatty acids, such as zinc, aluminum, calcium and magnesium salts of saturated fatty acids represented by caproic, caprilic, capric, myristic, palmitic, lauric, stearic acids and the higher acids such as those found in fish oil, containing twenty, twenty-two and twenty-four carbon atoms will function to control and reduce the coalescing tendency of the slurry of polymer in liquid, perhaps as external lubricants when added to the liquid in the flash tank in order to decrease the extent of agglomeration and to reduce the tendency for the polymer to adhere to metal and to coalesce in the intermediate drying and processing operations.

Of the alkaline earth and metal salts of the fatty acids enumerated above and as illustrated by the present invention, zinc stearate, or its commercial mixture with zinc palmitate, aluminum stearate, aluminum palmitate, calcium palmitate and magnesium stearate and the salts of fish oil acids are particularly suitable species to be added severally or in admixture in the form of soft, fine powders to the flash tank liquid prior to or simultaneously with the introduction of the reaction mixture thereto. Zinc stearate, however, is preferred since it is a valuble constituent in any subsequent curing operation. Since these salts are insoluble in isopropyl alcohol or any other alcohol or ether which may be used as dispersing media, they may be incorporated in the form of the alcoholic or ether suspensions and used as such in distributing the water insoluble soaps throughout the polymer mass.

The physical phenomenon involved in the formation of fine grained slurries of the polymeric materials by the addition of alkaline earth or metal salts of the higher fatty acids to the low temperature polymerization reactions or the suspension of these salts in alcohol or other suitable washing medium is not as yet known. Their main function is presumed to be that of coating or lubricating the polymer particles in the wash step in order to decrease the extent of agglomeration and to reduce the tendency of the polymer particles to coalesce and to adhere to the metal of the recovery system. This presumption is offered only as a possible suggestion but it has not, however, been proved and the invention should not be restricted by any theory or hypothesis as to the mechanism of what occurs.

In the above examples and throughout this specification and the appended claims, wherever the term "olefinic material" is used, it refers to iso-olefins such as isobutylene or to polyolefins such as butadiene, isoprene, piperylene; 2-methyl hexadiene-1,5; myrcene, hexatriene or any other mono-olefin or polyolefin or homolog thereof capable of interpolymerization with an iso-olefin.

The nature and objects of the present invention having thus been described and illustrated, what is claimed as new and useful and desired to be secured by Letters Patent is:

1. The polymerization and recovery process which comprises the steps in combination of polymerizing an iso-olefin having from 4 to 8, inclusive, carbon atoms per molecule at a temperature within the range between $-10°$ C., and $-160°$ C., by the application thereto at that temperature of a Friedel-Crafts catalyst in fluid condition, to produce a slurry of polymer in unpolymerized olefin, discharging the olefin-polymer slurry into a mixture of water at a temperature between 100° F., and 180° F., containing admixed therewith from 1% to 4% of a water insoluble metal soap of a high molecular weight fatty acid having from 6 to 18 carbon atoms per molecule with a metal selected from the group consisting of magnesium, zinc, aluminum and calcium in the presence of a wetting agent for the metal soap, to volatilize out residual reaction liquid and form a stable slurry of polymer in warm water; thereafter separating the polymer particles from the water.

2. The polymerization and recovery process comprising the steps in combination of mixing together an iso-olefin having from 4 to 8, inclusive, carbon atoms per molecule and a hydrocarbon diluent having less than 5 carbon atoms per molecule which is liquid at the reaction temperature, cooling the mixture to a temperature within the range between $-10°$ C., and $-160°$ C., polymerizing the cold mixture by the application thereto of a Friedel-Crafts catalyst in fluid condition to form a slurry of solid polymer particles in unpolymerized olefin and diluent, discharging the said polymer-olefin-diluent slurry into agitated water at a temperature within the range between 100° F., and 180° F., containing from 1% to 4% of a water insoluble metal soap of a high molecular weight fatty acid in which the acid contains from 6 to 18, inclusive, carbon atoms per molecule and the metal is one selected from the group consisting of magnesium, zinc, aluminum and calcium in the presence of a wetting agent for the metal soap, to volatilize out unpolymerized olefin and diluent to produce a slurry of polymer in warm water in finely divided, flowable form, separating the polymer particles from the water and withdrawing the vaporized olefin and diluent for purification and recycling.

3. The polymerization and recovery process comprising the steps in combination of mixing together an isoolefin having from 4 to 8, inclusive, carbon atoms per molecule and a chlorinated hydrocarbon diluent which is liquid at the reaction temperature, cooling the mixture to a temperature within the range between $-10°$ C., and $-160°$ C. polymerizing the cold mixture by the application thereto of a Friedel-Crafts catalyst dissolved in a non-complex forming solvent which is liquid at the polymerization temperature to produce a slurry of solid polymer particles in the cold olefin-diluent reaction liquid, discharging the said slurry into water, at a temperature within the range between 100° F., and 180° F., containing from 1% to 4% of a water insoluble metal soap of a fatty acid having from 6 to 18, inclusive, carbon atoms per molecule and a metal selected from the group consisting of magnesium, zinc, aluminum and calcium in the presence of a wetting agent for the metal soap, to volatilize out the olefin and diluent and convert the polymer to a slurry of finely divided polymer particles in water, withdrawing volatilized olefin and diluent, subjecting them to a purification treatment for recycling and separating the solid polymer from the water slurry.

4. The polymerization and recovery process which comprises the steps of mixing together an iso-olefin having from 4 to 8, inclusive, carbon atoms per molecule and a multiolefin having from 4 to 12, inclusive, carbon atoms per molecule, diluting the mixture with an organic diluent having from 1 to 5, inclusive, carbon atoms per molecule which is liquid at the reaction temperature, cooling the materials to a temperature within the range between $-10°$ C., and $-160°$ C., polymerizing the olefinic material in the mixture by the application thereto of a Friedel-Crafts catalyst in solution in a non-complex forming solvent which is liquid at the polymerization temperature to produce a slurry of solid polymer particles in unpolymerized olefins and diluent, discharging the said slurry into warm agitated water having a temperature within the range between 100° F., and 180° F., containing from 1% to 4% of a water insoluble metal soap of a fatty acid having from 6 to 18, inclusive, carbon atoms per molecule and a metal selected from the group consisting of magnesium, zinc, aluminum and calcium in the presence of a wetting agent for the metal soap, to volatilize out the residual unpolymerized olefins and the diluent and form a stable slurry of finely divided polymer particles in water, thereafter separating the polymer particles from the water slurry and drying the polymer.

5. The polymerization and recovery process which comprises mixing together from 70 to 99.5 parts by weight of an isoolefin having from 4 to 8, inclusive, carbon atoms per molecule with from 30 to 0.5 parts by weight of a multiolefin having from 4 to 12, inclusive, carbon atoms per molemule, polymerizing the mixture at a temperature within the range between $-10°$ C., and $-160°$ C., by the application thereto of a Friedel-Crafts catalyst dissolved in a non-complex forming solvent which is liquid at the polymerization temperature, to produce a slurry of solid polymer in diluent, discharging the polymer-diluent slurry into warm agitated water at a temperature within the range between 100° F., and 180° F., the water containing from 1% to 4% of a water insoluble metal soap of a fatty acid having from 6 to 18, inclusive, carbon atoms per molecule with a metal selected from the group consisting of magnesium, zinc, aluminum and calcium in the presence of a wetting agent for the metal soap, to volatilize out unpolymerized olefins and diluent and producing a slurry of finely divided polymer particles in water, containing at least a portion of the metal soap and thereafter separating the polymer particles from the water slurry.

6. The polymerization and recovery process comprising the steps in combination of mixing together from 70 to 99.5 parts by weight of isobutylene and from 30 to 0.5 parts by weight of a multiolefin having from 4 to 12, inclusive, carbon atoms per molecule and from 100 to 1,000 parts of an organic diluent having from 1 to 5, inclusive, carbon atoms per molecule which is liquid at the polymerization temperature, polymerizing the olefins in the said mixture at a temperature within the range between $-40°$ C., and $-103°$ C., by the application thereto of a Friedel-Crafts catalyst in solution in a non-complex forming solvent which is liquid when added to the said cold olefin-diluent mixture to produce a slurry of isobutylenic polymer particles in reaction liquid, thereafter discharging the slurry from the reaction zone into warm agitated water at a temperature within the range between $100°$ F., and $180°$ F., the warm water containing from 1% to 4% of a water insoluble soap of a fatty acid having from 6 to 18, inclusive, carbon atoms per molecule with a metal selected from the group consisting of magnesium, zinc, aluminum and calcium in the presence of a wetting agent for the metal soap, to volatilize out residual olefins and diluent and form a slurry of finely divided polymer particles in water and thereafter separating the polymer particles from the water slurry and drying them.

7. The polymerization and recovery process comprising the steps in combination of mixing together from 70 to 99.5 parts by weight of isobutylene and from 30 to 0.5 parts by weight of a multiolefin having from 4 to 12, inclusive, carbon atoms per molecule and from 100 to 1,000 parts of an organic diluent having from 1 to 5, inclusive, carbon atoms per molecule which is liquid at the polymerization temperature, polymerizing the olefins in the said mixture at a temperature within the range between $-40°$ C., and $-103°$ C., by the application thereto of a Friedel-Crafts catalyst in solution in a non-complex forming solvent which is liquid when added to the said cold olefin-diluent mixture to produce a slurry of isobutylenic polymer particles in reaction liquid, thereafter discharging the slurry from the reaction zone into warm agitated water at a temperature within the range between $100°$ F., and $180°$ F., the warm water containing from 1% to 4% of magnesium stearate in the presence of a wetting agent for the metal soap, to volatilize out residual olefins and diluent and form a slurry of finely divided polymer particles in water and thereafter separating the polymer particles from the water slurry and drying them.

8. The polymerization and recovery process comprising the steps in combination of mixing together from 70 to 99.5 parts by weight of isobutylene and from 30 to 0.5 parts by weight of a multiolefin having from 4 to 12, inclusive, carbon atoms per molecule and from 100 to 1,000 parts of an organic diluent having from 1 to 5, inclusive, carbon atoms per molecule which is liquid at the polymerization temperature, polymerizing the olefins in the said mixture at a temperature within the range between $-40°$ C., and $-103°$ C., by the application thereto of a Friedel-Crafts catalyst in solution in a non-complex forming solvent which is liquid when added to the said cold olefin-diluent mixture to produce a slurry of isobutylenic polymer particles in reaction liquid, thereafter discharging the slurry from the reaction zone into warm agitated water at a temperature within the range between $100°$ F., and $180°$ F., the warm water containing from 1% to 4% of aluminum stearate prepared as a dispersion in alcohol for addition to the water, to volatilize out residual olefins and diluent and form a slurry of finely divided polymer particles in water and thereafter separating the polymer particles from the water slurry and drying them.

9. The polymerization and recovery process comprising the steps in combination of mixing together from 70 to 99.5 parts by weight of isobutylene and from 30 to 0.5 parts by weight of a multiolefin having from 4 to 12, inclusive, carbon atoms per molecule and from 100 to 1,000 parts of an organic diluent having from 1 to 5, inclusive, carbon atoms per molecule which is liquid at the polymerization temperature, polymerizing the olefins in the said mixture at a temperature within the range between $-40°$ C., and $-103°$ C., by the application thereto of a Friedel-Crafts catalyst in solution in a non-complex forming solvent which is liquid when added to the said cold olefin-diluent mixture to produce a slurry of isobutylenic polymer particles in reaction liquid, thereafter discharging the slurry from the reaction zone into warm agitated water at a temperature within the range between $100°$ F., and $180°$ F., the warm water containing from 1% to 4% of zinc stearate prepared as a dispersion in alcohol for addition to the water, to volatilize out residual olefins and diluent and form a slurry of finely divided polymer particles in water and thereafter separating the polymer particles from the water slurry and drying them.

10. The polymerization and recovery process which comprises the steps in combination of mixing together from 70 to 99.5 parts by weight of isobutylene with from 30 to 0.5 parts by weight of a conjugated diolefin having from 4 to 6, inclusive, carbon atoms per molecule and from 100 to 1,000 parts by weight of methyl chloride, polymerizing the mixture at a temperature within the range between $-40°$ C., and $103°$., by the addition thereto of a solution of aluminum chloride in methyl chloride to produce a slurry of solid particles of copolymer in unpolymerized olefin and diluent, discharging the slurry into warm agitated water at a temperature within the range between $100°$ F., and $180°$ F., the said warm water containing also a dispersion of zinc stearate in isopropyl alcohol; to volatilize out unpolymerized olefins and diluent and convert the slurry into a slurry of polymer particles containing zinc stearate, in water and thereafter separating polymer particles from the water.

11. The polymerization and recovery process comprising the steps of mixing together approximately 1,450 parts of isobutylene, 20 parts of isoprene and 2,800 parts of methyl chloride and copolymerizing the olefins in the mixture by the application thereto at a temperature close to the boiling temperature at atmospheric pressure of liquid ethylene by the application thereto of a solution of aluminum chloride in methyl chloride, to produce a slurry of copolymer in methyl chloride, discharging the methyl chloride slurry into warm water at a temperature within the range between $100°$ F., and $180°$ F., the said warm water containing from 1% to 4% of zinc stearate, simultaneously introduced to produce a slurry of polymer particles in water, and thereafter separating the polymer particles from the water.

12. The polymerization and recovery process comprising the steps of mixing together approximately 1,450 parts of isobutylene, 20 parts of isoprene and 2,800 parts of methyl chloride and copolymerizing the olefins in the mixture by the application thereto at a temperature close to the boiling temperature at atmospheric pressure of liquid ethylene by the application thereto of a solution of aluminum chloride in methyl chloride, to produce a slurry of copolymer in methyl chloride, discharging the methyl chloride slurry into warm water at a temperature within the range between 100° F., and 180° F., the said warm water containing from 1% to 4% of zinc stearate, simultaneously introduced as a slurry in propyl alcohol to produce a slurry of polymer particles in water, and thereafter separating the polymer particles from the water.

13. The process comprising mixing 60 to 99.5 weight percent of isobutylene and 40 to 0.5 percent of a polyolefin having 4 to 10 carbon atoms and an organic diluent which has less than 5 carbon atoms and is liquid at the reaction temperature, cooling the mixture to a temperature within the range between −40° C. and −150° C., and contacting said cold mixture with a solution of a Friedel-Crafts catalyst in a non-complex-forming organic solvent which is liquid when contacted with said mixture, to form a slurry of solid polymer particles in cold reaction liquid, discharging said slurry into heated, well-agitated water to which has been added a dispersion of a water-insoluble metal soap of a fatty acid having from 16 to 18 carbon atoms per molecule and a metal selected from the group consisting of magnesium, zinc, aluminum and calcium in a mixture of water and a wetting agent, the soap being present in a proportion on the order of magnitude of 0.6% to 1% of the weight of polymer slurried; in suspension in order to flash off the volatile reaction liquid and form a slurry of finely divided polymer particles in water, and separating the polymer particles from said water slurry.

14. The process which comprises polymerizing isobutylene at a temperature between −40° C. and −160° C., in a diluent which has 1 to 4 carbon atoms per molecule and is liquid at the polymerization temperature, in contact with a Friedel-Crafts catalyst dissolved in an organic non-complex forming solvent which is liquid at the reaction temperature to form a slurry of solid polymer particles in cold reaction liquid, discharging said slurry into heated well-agitated water containing a water-insoluble soap of a fatty acid having from 16 to 18 carbon atoms per molecule and a metal selected from the group consisting of magnesium, zinc, aluminum and calcium, the soap being present in a proportion on the order of magnitude of 0.6% to 1% of the weight of polymer slurried; in order to flash off the volatile reaction liquid and form a slurry of finely divided polymer particles in water, and separating the polymer particles from said water slurry.

15. The process which comprises copolymerizing isobutylene and a conjugated diolefin having 4 to 10 carbon atoms per molecule at a temperature between −40° C. and −160° C., with a Friedel-Crafts catalyst dissolved in an organic non-complex forming solvent which is liquid at the reaction temperature to form a solid polymer discharging the polymer into heated well-agitated water containing a water-insoluble soap of a fatty acid having 16 to 18 carbon atoms per molecule and a metal selected from the group consisting of magnesium, zinc, aluminum and calcium, the soap being present in a proportion on the order of magnitude of 0.6% to 1% of the weight of polymer slurried; in order to flash off the volatile reaction liquid and form a slurry of finely divided polymer particles in water, and separating the polymer particles from said water slurry.

16. The process which comprises copolymerizing one part of a mixture consisting of 60 to 99.5 weight percent of isobutylene and 40 to 0.5 weight percent of a conjugated diolefin having 4 to 6 carbon atoms per molecule in up to 10 parts of a suitable diluent which has 1 to 4 carbon atoms per molecule and is liquid at the reaction temperature by adding thereto a solution of an aluminum halide catalyst in a low freezing non-complex forming solvent, which solution is liquid at the reaction temperature, to form a slurry of solid polymer particles in reaction liquid at a temperature between −40° C. and −160° C., withdrawing the slurry from the reaction zone and discharging it into heated well-agitated water containing a suspension of zinc stearate, the soap being present in a proportion on the order of magnitude of 0.6% to 1% of the weight of polymer slurried; in order to flash off the volatile reaction liquids and to form a slurry of finely divided polymer particles in water, and separating the polymer particles from said water slurry.

17. The process which comprises polymerizing one part of a mixture consisting of 60 to 99.5 weight percent of isobutylene and 40 to 0.5 weight percent of isoprene in up to 10 parts of a suitable diluent which has 1 to 4 carbon atoms per molecule and is liquid at the reaction temperature, by adding thereto a solution of Friedel-Crafts catalyst in a low freezing non-complex forming solvent which solution is liquid at the reaction temperature to form a slurry of solid polymer particles in reaction liquid at a temperature between −40° C. and −160° C., withdrawing the slurry from the reaction zone, discharging it into heated well-agitated water containing zinc stearate, the soap being present in a proportion on the order of magnitude of 0.6% to 1% of the weight of polymer slurried; in order to flash off the volatile reaction liquids and form a slurry of finely divided polymer particles in water and separating the polymer particles from said water slurry.

PER K. FROLICH.

REFERENCES CITED

The following references are of record in the file of this patent:

UNITED STATES PATENTS

| Number | Name | Date |
|---|---|---|
| 2,408,007 | Thomas | Sept. 24, 1946 |
| 2,456,265 | Frolich | Dec. 14, 1948 |
| 2,462,123 | Nelson | Feb. 22, 1949 |